United States Patent
Ross et al.

(10) Patent No.: US 9,997,955 B1
(45) Date of Patent: Jun. 12, 2018

(54) MULTI-INPUT UNINTERRUPTIBLE POWER SYSTEM

(71) Applicant: Amazon Technologies, Inc., Seattle, WA (US)

(72) Inventors: Peter George Ross, Olympia, WA (US); Michael Phillip Czamara, Seattle, WA (US); Brock Robert Gardner, Seattle, WA (US); Osvaldo P. Morales, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 14/934,056

(22) Filed: Nov. 5, 2015

(51) Int. Cl.
*H02J 9/00* (2006.01)
*H02J 9/06* (2006.01)

(52) U.S. Cl.
CPC ..................... *H02J 9/06* (2013.01)

(58) Field of Classification Search
CPC ........................................................ H02J 9/00
See application file for complete search history.

(56) References Cited

U.S. PATENT DOCUMENTS

| | | | |
|---|---|---|---|
| 8,957,547 B2 * | 2/2015 | Chang | H02J 9/061 307/64 |
| 9,024,465 B2 * | 5/2015 | Guo | H02J 9/04 307/2 |
| 9,537,351 B2 * | 1/2017 | Lee | G06F 1/30 |
| 2010/0275441 A1 | 11/2010 | Rasmussen et al. | |
| 2012/0086458 A1 | 4/2012 | Wei et al. | |

OTHER PUBLICATIONS

U.S. Appl. No. 14/656,356, filed Mar. 12, 2015, Ross, et al.
"Battery Circuits for Stationary Applications Designed for the Long Haul," Matthew Theriault, Designer, Hindly Power Inc., Easton, PA, downloaded from http://www.battcon.com/PapersFinal2010/TheriaultPaper2010Final_19.pdf, 2010, pp. 19-1 through 19-12.
HindlePower, "Best Battery Selector—Isolating Steering Diode Assembly for Redundant DB Power Systems," JF5048-00—Rev 1B, Jun. 18, 2015, pp. 1-4.

* cited by examiner

*Primary Examiner* — Hai L Nguyen
(74) *Attorney, Agent, or Firm* — Robert C. Kowert; Meyertons, Hood, Kivlin, Kowert & Goetzel, P.C.

(57) ABSTRACT

A multi-input uninterruptible power system (UPS) includes a primary power circuit, a secondary power circuit, and a diode circuit. The primary power circuit and the secondary power circuit include rectifiers that convert AC power into DC power. A diode circuit is electrically coupled between the secondary power circuit and an internal bus of the multi-input UPS. The diode circuit prevents backflow of power into the secondary power circuit when electrical power is received from a primary power source electrically coupled to the primary power circuit and allows electrical power from a secondary power source electrically coupled to the secondary power circuit to flow to the internal bus when electrical power is not being received from the primary power source. An outlet of the multi-input UPS electrically coupled to the internal bus is electrically coupled to a group of electrical loads of multiple groups of electrical loads in a data center.

21 Claims, 7 Drawing Sheets

MULTI-INPUT UNINTERRUPTIBLE POWER SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage. A network of cabling, bus bars, power connectors, and power distribution units, is used to deliver the power at the lower voltage to numerous specific components in the facility.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply, and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, uninterruptible power supplies, and PDUs, for example) and in terms of costs of operation and maintenance.

Some data centers with an uninterruptible power supply in a primary power system or back-up power system may have a large affected zone when an uninterruptible power supply failure in the primary or back-up power system occurs. In addition, some data centers have "single threaded" distribution via the electrical supply to the floor, and in which maintenance can only be performed when the components are shut-off.

Some data centers with primary power systems and back-up power systems include automatic transfer switches to switch between the primary and back-up power systems in case of a loss of power in one of the power systems. Such, automatic transfer switches may include mechanical components, such as a mechanical switches, that require periodic testing and maintenance, thus adding to costs of operation of the data center. Also, some mechanical automatic transfer switches may fail to switch or may be delayed in switching during a loss of power event thus adversely affecting operation of computer systems receiving electrical power via the automatic transfer switch.

Figure 1:
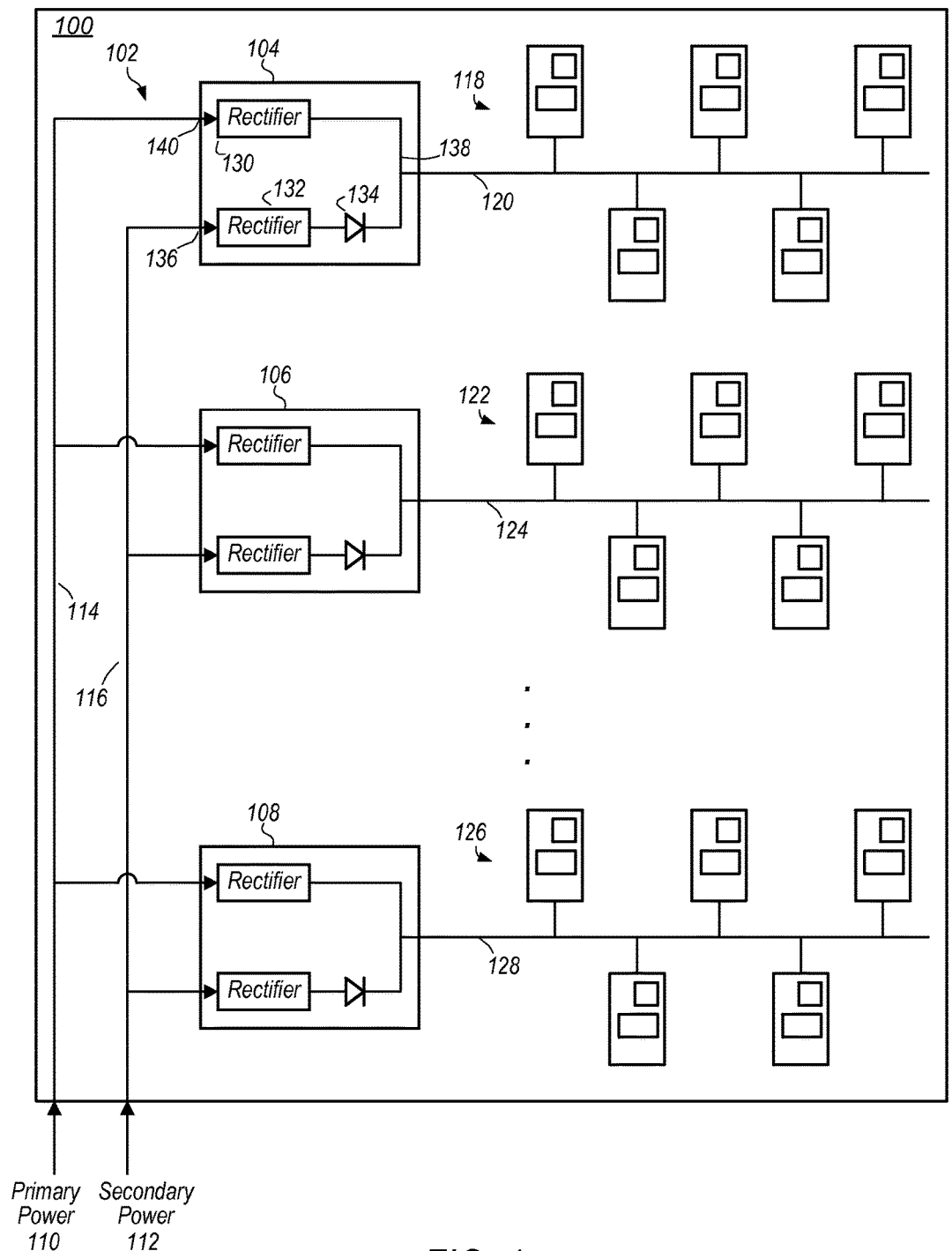
FIG. 1 is a block diagram illustrating a power distribution system that includes multiple multi-input uninterruptible power systems (UPSs) providing electrical power support to multiple groups of loads in a data center, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a multi-input uninterruptible power system (UPS) are disclosed. A multi-input uninterruptible power system may also be referred to herein as a multi-input UPS, modular multi-input UPS or a multi-input uninterruptible power supply. According to one embodiment, a data center includes a power distribution system that provides electrical power support to multiple groups of electronic loads in the data center. The power distribution system includes a primary power feed from a primary power source, a secondary power feed from a secondary power source, and multiple multi-input UPSs. Each multi-input UPS provides electrical power support to a respective group of electrical loads in the data center. Also, each multiple input UPS include a primary rectifier electrically coupled to the primary power feed and configured to convert electrical power received from the primary power source to direct current (DC) power, wherein the primary rectifier circuit is electrically coupled to an internal power bus of the multi-input UPS, wherein the internal power bus is electrically coupled to a respective group of electrical loads. Each multi-input UPS also includes a secondary rectifier circuit electrically coupled to the secondary power feed and configured to convert electrical power received from the secondary power source to DC power. The multi-input UPS also includes a diode circuit, wherein the secondary rectifier circuit is electrically coupled to the internal power bus via the diode circuit, wherein the diode circuit is configured to prevent flow of electrical power into the secondary rectifier circuit from the internal power bus and is configured to permit flow of electrical power to the respective group of electrical loads from the secondary rectifier circuit, via the internal power bus when the multi-input UPS is not receiving electrical power from the primary power source. For example, the diode circuit of the multi-input UPS may transition the multi-input UPS from feeding electrical power to a group of electrical loads electrically coupled to the multi-input UPS from a primary power source to a secondary power source in response to a loss of power being received from the primary power source.

According to one embodiment, an multi-input UPS includes a primary power circuit configured to convert alternating current (AC) power received via a primary input of the apparatus to direct current (DC) power, wherein the primary power circuit is electrically coupled to a power bus of the apparatus that is electrically coupled to an output of the apparatus; a secondary power circuit configured to convert AC power received via a secondary input of the apparatus to DC power; and a diode circuit, wherein the secondary power circuit is electrically coupled to the power bus via the diode circuit, wherein the diode circuit is configured to prevent flow of electrical power into the secondary power circuit and configured to permit flow of electrical power to the power bus from the secondary power circuit when power is not received via the primary input.

According to one embodiment, a power distribution system is configured to provide uninterruptible power support to a particular group of loads of a plurality of groups of loads in a facility. The power distribution system includes a primary power circuit configured to convert alternating current (AC) power received from a primary power source to direct current (DC) power, wherein the primary power circuit is electrically coupled a common power bus configured to distribute electrical power to the particular group of loads. The power distribution system also includes a secondary power circuit configured to convert AC power received from a secondary power source to DC power, and a power source selection circuit, wherein the secondary power circuit is electrically coupled to the common power bus via the power source selection circuit, wherein the power source selection circuit is configured to prevent flow of electrical power into the secondary power circuit and configured to permit flow of electrical power to the particular group of loads via the common power bus from the secondary power circuit when power is not received from the primary power source. The power distribution circuit includes one or more batteries electrically coupled to the common power bus downstream of the primary power circuit and the secondary power circuit.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, providing electrical power "support", power feed support, etc. refers to providing one or more power feeds to be available to one or more downstream systems and components, including one or more electrical loads. Such provided power feeds may be precluded from being received by the systems and components but may be made available for receipt based at least in part upon a condition of one or more components upstream of the systems and components. For example, a reserve power system can provide reserve power support to an electrical load by providing a reserve power feed that can be selectively fed to the load by a diode circuit that is downstream of the reserve power system and upstream of the load, where the diode circuit may selectively feed power from the reserve power feed or a primary power feed to the load based at least in part upon one or more conditions associated with the primary power feed.

As used herein, providing "battery power support" refers to providing one or more power feeds to be available from one or more batteries to one or more downstream systems and components, including one or more electrical loads. Such battery feeds may be precluded from being received by the systems and components but may be made available for receipt based at least in part upon one or more conditions in the system. For example, a battery may provide battery power support to a group of electrical loads such that the battery is available to provide electrical power to the group of one or more electrical loads and in the case of the group of electrical loads not receiving electrical power from other power sources, the group of electrical load receives electrical power from the battery.

As used herein, "primary power" means any power that can be supplied to an electrical load, for example, during normal operating conditions.

As used herein, "reserve power", "secondary power", etc. means power that can be supplied to an electrical load upon the failure of, or as a substitute for, primary power to the load.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "module" is a component or a combination of components. A module may include functional elements and systems, such as computer systems, rectifier circuits, inverter circuits, diode circuits, or batteries as well as structural elements, such a base, frame, housing, or container.

As used herein, one component in a power infrastructure is "downstream" from another component in the system if the one component receives power from the other component or is at a lower level in the system than the other component. For example, a data center may be downstream from a power plant.

As used herein, a "power feed" includes power from any source, including but not limited to power received from a utility power source that can be supplied to an electrical load. In some embodiments, a "power feed" may be received from the output of a transformer. For example, a low-voltage power feed received from a transformer may include low-voltage power received over a low-voltage power transmission line coupled to the transformer.

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may isolate various electrical and computing systems in the facility from upstream power feeds. In some embodiments, switchgear includes switching devices, fuses, circuit breakers, or combinations thereof used to switch between separate power sources.

As used herein, one component in a system is "upstream" from another component in the system if the one component supplies power to the other component or is at a higher level in the system than the other component. For example, an electrical substation supplying power to a data center may be upstream from the data center.

In various embodiments, a multi-input uninterruptible power system (UPS) includes a primary power circuit, a secondary power circuit, and a diode circuit. The primary power circuit may receive alternating current (AC) power via a power feed from a primary power source and the secondary power circuit may receive AC power via a secondary power feed from a secondary power source. Both the primary power circuit and the secondary power circuit may be configured to covert AC power respectively received from the primary power source and the secondary power source to DC power. The diode circuit may be electrically coupled between the secondary power circuit and an internal bus of the multi-input UPS and may be biased such that the multi-input UPS preferentially feeds electrical power received from the primary power source via an outlet electrically coupled to the internal bus. In response to a voltage of the primary feed from the primary power source falling below a given voltage, the diode circuit may automatically transition to feed electrical power received from the secondary power source. In some embodiments, a multi-input UPS may feed high voltage DC power (approximately 400V DC) to a group of electrical loads via a common power bus. In some embodiments, a multi-input UPS may include an inverter circuit that converts DC power to AC power, and the multi-input UPS may feed AC power to a group of electrical loads via a common power bus. In some embodiments, a multi-input UPS may include one or more batteries and the multi-input UPS may be configured to provide battery power support to a group of electrical loads. In some embodiments, one or more batteries may be electrically coupled to a common power bus that feeds electrical power from a multi-input UPS to a group of electrical loads and may provide battery power support to the group of electrical loads.

In various embodiments, a data center includes multiple groups of electrical loads, such as rack mounted computer systems, network switches, air moving devices, etc. Each group of the multiple groups of electrical loads may be provided electrical power support by a separate multi-input UPS and common power bus. In contrast to data centers that include large upstream uninterruptible power supplies in both a primary power system and a reserve power system, a group of electrical loads in a data center electrically coupled to a multi-input UPS may receive electrical power support and battery power support from a single multi-input UPS electrically connected to both a primary power feed of the data center and a secondary power feed of the data center. Thus, a single multi-input UPS may provide electrical power support and battery power support to a group of electrical loads whereas data centers with upstream uninterruptible power supplies may require two or more upstream uninterruptible power supplies and one or more automatic transfer switches to provide similar electrical power support and battery power support to the group of electrical loads.

In addition, some data centers may provide battery power support to several groups of electrical loads via the same primary power system and the same reserve power system. In such data centers, the primary power system may include a single upstream uninterruptible power supply and the reserve power system may include a single upstream uninterruptible power supply. When one of the single upstream uninterruptible power supplies in the primary power system or the reserve power system fails, multiple groups of electrical loads in the data center may lose battery power support and/or electrical power support. In contrast, data centers that include multiple multi-input UPSs that each provide electrical power support to separate groups of electrical loads may have affected zones that are limited to a single group of electrical loads. For example an affected zone may include a single row or a partial row of rack mounted computer systems. Thus an affected zone affected by a failure of a multi-input UPS may include fewer rack computer systems than a failure of an upstream uninterruptible power supply in data centers that provide electrical power support to several groups of electrical loads via a single uninterruptible power supply in an upstream power system.

Furthermore, some data centers may include automatic transfer switches to switch between receiving electrical power from a primary power system that includes an upstream uninterruptible power supply and a secondary power system that includes an upstream uninterruptible power supply. In contrast, a data center including multiple multi-input UPSs that each provide electrical power support to different groups of electrical loads, may not include upstream uninterruptible power supplies and automatic transfer switches. A multi-input UPS may transition between feeding electrical power from a primary power source to a secondary power source automatically via a diode circuit without mechanical components such as those used in automatic transfer switches. Thus increasing reliability of a power distribution system by reducing a probability of failure associated with mechanical switches included in automatic transfer switches. A multi-input UPS may also provide battery support, such a single set of batteries included in a multi-input UPS may provide the same functionality as two or more upstream uninterruptible power supplies in a primary power system and a reserve power system.

FIG. 1 is a block diagram illustrating a power distribution system providing electrical power support to a plurality of electrical loads in a data center, according to some embodiments. FIG. 1 includes data center 100 and power distribution system 102. Power distribution system 102 includes multi-input UPSs 104, 106, and 108. Common power busses 120, 124, and 128 distribute electoral power from multi-input UPSs 104, 106, and 108 to electrical loads 118, 122, and 124. Power distribution system 102 receives electrical power from primary power source 110 and secondary power source 112 and feeds electrical power to multi-input UPSs 104, 106, and 108 via primary power feed 114 and secondary power feed 116.

A data center that includes multiple multi-input UPSs may be configured such that each multi-input UPS provides electrical power support and/or battery power support to a separate group of electrical loads. For example, multi-input UPS 104 provides electrical power support to electrical loads 118 via common power bus 120; multi-input UPS 106 provides electrical power support to electrical loads 122 via common power bus 124; and multi-input UPS 108 provides electrical power support to electrical loads 126 via common power bus 128. In some embodiments, common power busses, such as common power busses 120, 124, and 128, may distribute direct current (DC) power to groups of electrical loads, such as electrical loads 118, 122, and 126. In some embodiments, a multi-input UPS, such as multi-input UPSs 104, 106, and 108, may include an inverter circuit that converts DC electrical power to alternating current (AC) electrical power and an associated common power bus, such as common power busses 120, 124, and 128, may distribute AC electrical power to electrical loads, such as electrical loads 118, 122, and 126.

A multi-input UPS may include a primary power circuit, such as primary power circuit 130 of multi-input UPS 104, and a secondary power circuit, such as secondary power circuit 132 of multi-input UPS 104. A primary power circuit may be configured to receive AC electrical power from a power feed of a data center via a primary power input of the multi-input UPS and convert the received AC electrical power to DC electrical power. The primary power circuit may feed the DC electrical power to an internal us of a multi-input UPS. For example, primary power circuit 130 of multi-input UPS 104 receives AC electrical power from primary power feed 114 of data center 100 via primary power input 140. Primary power circuit 130 converts the received AC electrical power into DC electrical power and feeds the DC electrical power to internal bus 138 of multi-input UPS 104. A primary power circuit, such as primary power circuit 130, may include a rectifier circuit that converts AC electrical power into DC electrical power. In a similar manner to a primary power circuit, a secondary power circuit of a multi-input UPS may receive AC electrical power from a secondary power feed of a data center via a secondary power input of the multi-input UPS. The secondary power circuit may convert the received AC electrical power into DC electrical power. However, a secondary power circuit may be electrically coupled to a diode circuit, such as diode circuit 134, so that electrical power fed from the secondary power circuit is fed to an internal bus a multi-input UPS via the diode circuit. For example, secondary power circuit 132 may receive AC electrical power from secondary power feed 116 of data center 100 via secondary power input 136. Secondary power circuit 132 may include a rectifier circuit that converts the received AC electrical power into DC power and may feed the DC power to internal bus 138 via diode circuit 134.

A diode circuit, such as diode circuit 134, may include one or more diodes that are configured such that the one or more diodes allow current to flow from a secondary power circuit into an internal bus of a multi-input UPS when a voltage of the secondary power circuit is greater than a voltage of the internal bus, and may prevent electrical current to flow into the secondary power circuit when a voltage of the internal bus is greater than a voltage of the secondary power circuit. For example, diode circuit 134, may allow electrical current to flow from secondary power circuit 132 to internal bus 138 when the voltage of secondary power circuit 132 at the entrance to diode circuit 134 is greater than the voltage of internal bus 138 at the exit of diode circuit 134. In another example, diode circuit 134 may prevent electrical current from back feeding into secondary power circuit 132 when a voltage of internal bus 138 at the exit of diode circuit 134 is greater than a voltage of secondary power circuit 132 at an entrance of diode circuit 134.

Under normal operating conditions a multi-input UPS may feed electrical power to a group of loads from a primary power source. In case of a loss of electrical power feed from the primary power source, a multi-input UPS may automatically transition to feed electrical power to the group of electrical loads from a secondary power source. For example, under normal operating conditions multi-input UPS 104 may feed electrical power received from primary power source 110 to electrical loads 118 via common power bus 120. In the event of a loss of electrical power from primary power source 110 multi-input UPS 104 may automatically transition to feed electrical power to electrical loads 118 from secondary power source 112.

A multi-input UPS may transition between feeding electrical power from a primary power source to feeding electrical power from a secondary power source and vice-versa based on respective voltages of electrical power in a primary power feed from the primary power source and in a secondary power feed from the secondary power source. For example, primary power feed 114 and secondary power feed 166 may be at equivalent voltages. The outlets of primary power circuit 130 and secondary power circuit 132 of multi-input UPS 104 may also be equivalent (e.g. both at approximately 400 volts DC or in some embodiments both at some other voltage such as approximately 200 volts DC). Diode circuit 134 may have a slight voltage drop across it, so that internal bus 138 that is electrically coupled to the outlet of primary power circuit 130 and at the same voltage as primary power circuit 130 is at a slightly higher voltage than an exit of diode circuit 134. Thus electrical power may not flow from secondary power circuit 132 to internal bus 138 when primary power circuit 130 is feeding DC electrical power to internal bus 138 at an equivalent voltage as secondary power circuit 132. However, in the case of a loss of power feed from primary power feed 114 or in the case of a drop in voltage at the outlet of primary power circuit 130, the voltage of internal bus 138 may fall below the voltage of the exit of diode circuit 134. In this situation, where the voltage at the outlet of secondary power circuit 132 is greater than the voltage at the outlet of primary power circuit 130, diode circuit 134 may allow electrical power to flow to internal bus 138 from secondary power circuit 132. Thus uninterrupted electrical power is provided to electrical loads 118 during a transition from feeding electrical power from primary power source 110 to feeding electrical power from secondary power source 112.

In a different situation, wherein power feed is not lost from a primary power feed but is instead lost from a secondary power feed, a diode circuit may prevent electrical power from back feeding into the secondary power circuit. For example, if the voltage at the outlet of primary power circuit 130 is higher than the voltage at the outlet of secondary power circuit 132, diode circuit 134 may prevent electrical power from back flowing from the higher voltage internal bus electrically coupled to primary power circuit 130 into the lower voltage secondary power circuit 132.

While, multi-input UPSs 104, 106, and 108 are depicted in FIG. 1 to include a single diode circuit, in some embodiments, a multi-input UPS may include multiple diode circuits. For example, a multi-input UPS may include a diode circuit electrically coupled between an outlet of a secondary power circuit and an internal bus (as shown in FIG. 1 by diode circuit 134 electrically coupled between secondary power circuit 132 and internal bus 138) and may also include a diode circuit electrically coupled between an outlet of a primary power circuit and an internal bus (not shown in FIG. 1). In some embodiments that have diode circuits coupled between both a primary power circuit and an internal bus and a secondary power bus and the internal bus, the diode circuits may have different voltage drops across the diode circuits. For example a voltage drop across a diode circuit electrically coupled between a secondary power circuit and an internal bus may have a greater voltage drop than a diode circuit electrically coupled between a primary power circuit and an internal bus such that electrical power is preferentially fed from the primary power circuit when the primary power circuit and the secondary power circuit are operating at equivalent voltages. A diode circuit electrically coupled between a primary power circuit and an internal bus a multi-input UPS may have similar functionality as a diode circuit electrically couple between a secondary power circuit and an internal bus a multi-input UPS in that a diode circuit electrically coupled between a primary power circuit and an internal bus of a multi-input UPS may permit electrical current to flow from the primary power circuit to the internal bus may prevent electrical current from back flowing from the internal bus into the primary power circuit.

FIG. 1 illustrates three multi-input UPSs that feed electrical power to three groups of electrical loads via three different common power busses. However, the ellipses between electrical loads 122 and electrical loads 126 are intended to indicate that a data center may include more or less multi-input UPSs and corresponding groups of loads that are fed by corresponding common power busses. Also, the groups of electrical loads 118, 122, and 126 are depicted to include five rack computer systems. However, in some embodiments a multi-input UPS may provide electrical power support to a group of electrical loads that include different quantities or types of electrical loads.

Figure 2:
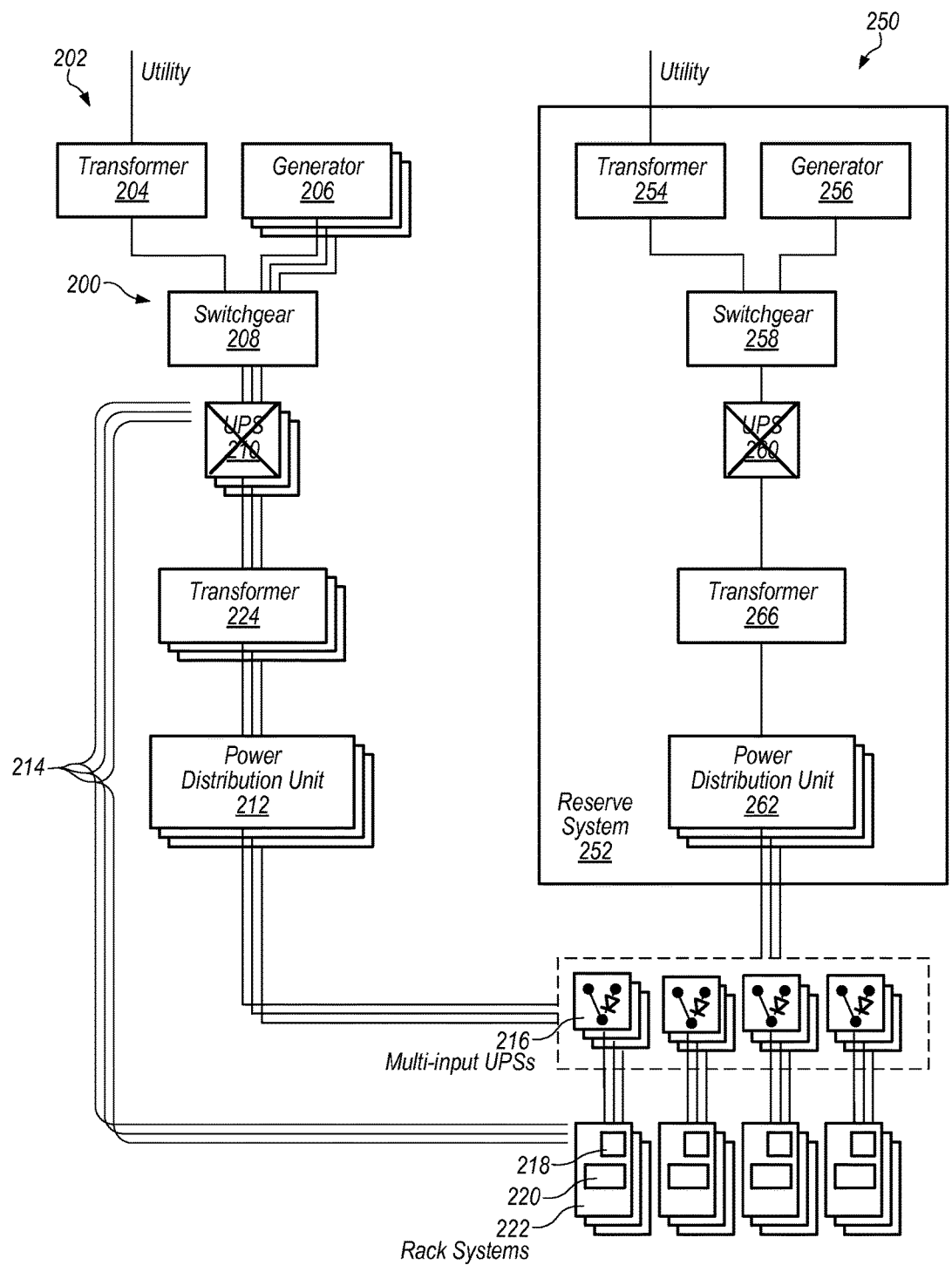
FIG. 2 illustrates a primary and reserve power system of a power distribution system that includes multi-input UPSs, according to some embodiments.

FIG. 2 illustrates a data center comprising primary power systems and a secondary power system that supply electrical power to multi-input UPSs, according to some embodiments. FIG. 2 illustrates an example data center that may include any of the multi-input UPSs 104, 106 or 108 described in regard to FIG. 1. Data center 200 includes racks 222, primary power side 202 and reserve power side 250. Reserve power side 250 includes reserve power system 252. Data center 200 shown in FIG. 2, includes multi-input UPSs 216 electrically coupled to primary power side 202 and reserve power side 250. Multi-input UPSs 216 may be any of multi-input UPSs 104, 106, or 108 illustrated in FIG. 1.

Primary power side 202 includes transformer 204, generators 206, and switchgear 208, and primary power systems 214. Sets of computer systems 220 in racks 222 may perform computing operations in data center 200. Computer systems 220 may be, for example, servers in a server room of data center 200. Computer systems 220 in racks 222 may each receive power from one of primary power systems 214. In one embodiment, each of primary power systems 214 corresponds to, and provides power to, the servers in one room in data center 200. In one embodiment, each of primary power systems 214 may correspond to, and provides power to, one half of a rack system in data center 200.

Primary power systems 214 each include floor power distribution units 212 that provide power to various racks 222. In some embodiments, floor power distribution units 212 include transformers that transform the voltage from switchgear 208. Each of racks 222 may include a rack power distribution unit 218. Rack power distribution units 218 may distribute power to computer systems 220.

Transformer 204 is coupled to a utility feed. The utility feed may be a medium voltage feed. In certain embodiments, the utility feed is at a voltage of about 13.5 kilovolts or 12.8 kilovolts at a frequency of about 60 Hz. Generators 206 may provide power to primary power systems 214 in the event of a failure of utility power to transformer 204. In one embodiment, one of generators 206 provides back-up power for each of primary power systems 214.

Reserve power system 252 may provide reserve power for all of the computer systems 220 supplied by primary power systems 214. In some embodiments, reserve power system 252 is powered up at all times during operation of data center 200. Reserve power system 252 may be passive until a failure of one or more components of primary power side 202, at which time reserve power system 252 may become active.

For illustrative purposes, three primary power systems are shown in FIG. 2 (for clarity, details of only the front primary power system 214 are shown). The number of primary power systems 214 on primary power side 202 may vary, however. In certain embodiments, a primary power side may include only one primary power system. In addition, the number of power distribution units, switchgear apparatus may vary from embodiment to embodiment (and, within a given embodiment, from system to system). In some embodiments, primary power system 214 includes many floor power distribution units 212.

Reserve power system 252 includes transformer 254 and generator 256. Transformer 254 may supply power to switchgear 258. Floor power distribution unit 262 may receive power from switchgear 258.

Primary power system 214 includes isolation transformer 224 and reserve power system 252 includes isolation transformer 266. Isolation transformers 224 and 266 may isolate downstream loads such as computer systems 220 from noise or harmonics in primary power systems 214 and reserve power system 252.

In some embodiments, a multi-input UPS may include one or more batteries, or a common DC power bus electrically coupled to a multi-input UPS may include one or more batteries. In such arrangements, electrical battery support may be provided by a downstream multi-input UPS and upstream uninterruptible power supplies may not be included in a power distribution system. For example, UPSs 210 and 260 may not be included in primary power system 214 and reserve power system 252.

Figure 3:
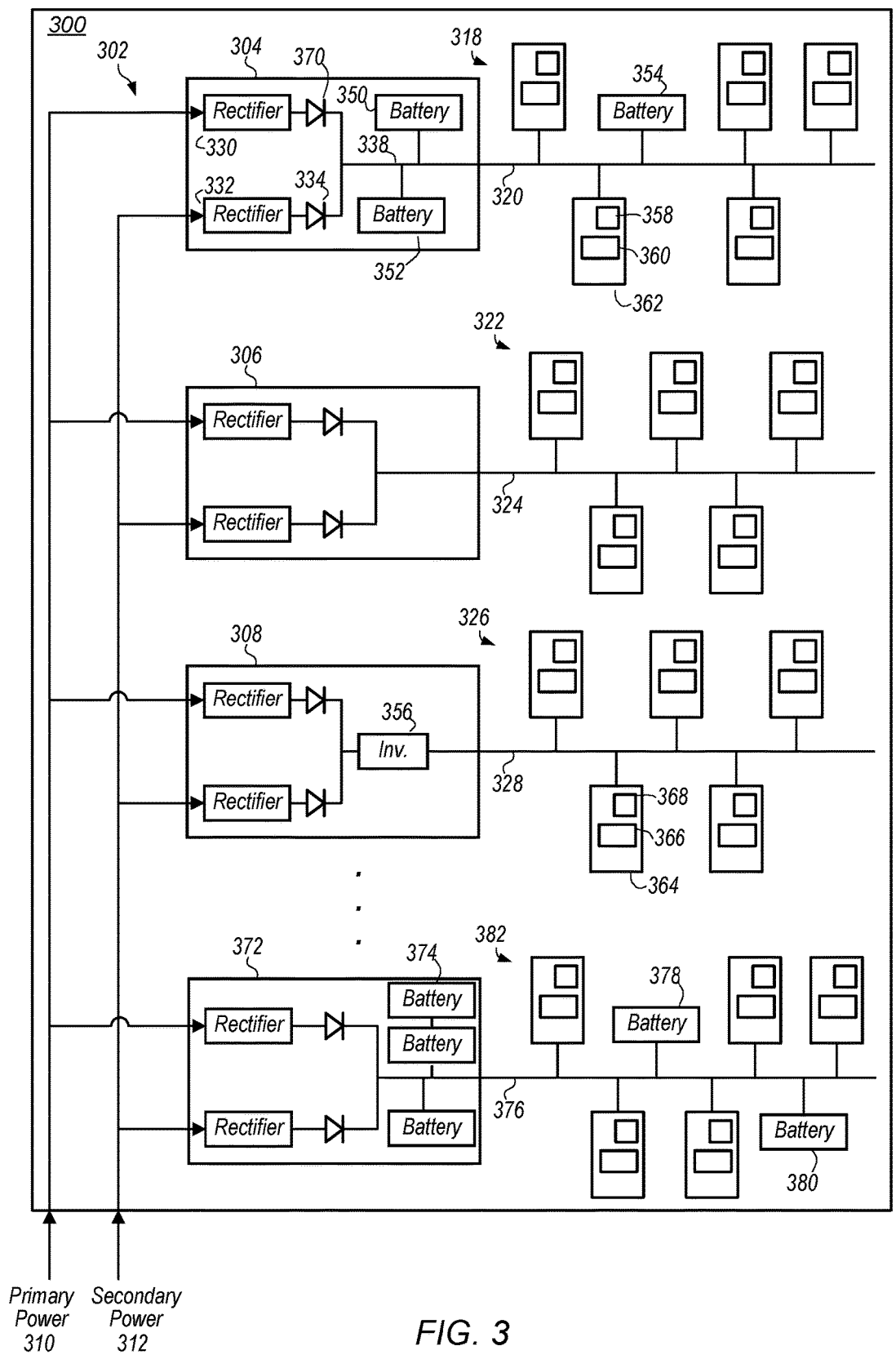
FIG. 3 is a block diagram illustrating a power distribution system that includes a multi-input UPS providing electrical power support and battery power support to multiple groups of loads in a data center, according to some embodiments.

For example, FIG. 3 illustrates a data center 300 that includes a power distribution system 302 similar to data center 100 and power distribution system 102 illustrated in FIG. 1. In FIG. 3, multi-input UPS 304 includes batteries 350 and 352. Also, battery 354 is electrically coupled to common power bus 320. In some embodiments, an amount of battery support provided for a particular group of electrical loads that receive electrical power support from a multi-input UPS may be adjusted. For example, an amount of holdup time for which a group of electrical loads, such as electrical loads 318, may be provided battery power from batteries when electrical power is not received from a primary power source or a secondary power source, such as primary power source 310 and secondary power source 312, may be adjusted by adding more batteries to a multi-input UPS or a common power bus that feeds electrical power to the group of electrical loads. For example, additional batteries such as batteries 350 and 352 may be included in multi-input UPS 304 to increase an amount of battery support provided by multi-input UPS 304. Also, in embodiments in which a common power bus, such as common power bus 320, distributes DC electrical power to a group of electrical loads, such as electrical loads 318, an amount of battery power support may be adjusted by electrically coupling additional batteries to the common power bus, such as electrically coupling additional batteries 354 to common power bus 320.

In some embodiments, some groups of electrical loads in a computing room receiving electrical power from a power distribution system may be provided battery power support while other groups of electrical loads in the computing room receiving electrical power from a power distribution system may not be provided battery power support. For example, multi-input UPS 306 and common power bus 324 do not include batteries and are not electrically coupled to batteries. Thus electrical loads 322 are provided electrical power support from multi-input UPS 306, but are not provided battery power support. A data center arranged such as data center 300, may allow battery power support to be selectively provided to electrical loads that require battery power support without unnecessarily providing battery power support to loads that do not require battery power support. In some embodiments, groups of electrical loads, such as electrical loads 318, 322, and 326 may comprise a row of rack mounted computer systems or a group of electrical loads may include only a partial row of rack mounted computer systems.

For example, some electric loads may be computer systems that perform storage of data in a storage system. Such storage systems may be redundantly configured such that the storage systems redundantly store portions of data volumes in different physical locations. Such storage systems may be configured such that if a portion of a storage volume stored in a particular physical location is lost, the entire data volume can be recreated from the remaining portions of the data volume stored in other physical locations. Because such systems are tolerant to failures, it may not be necessary to provide battery power support to computer systems implementing such systems. Accordingly, costs of operations of a data center may correspondingly be reduced by not providing battery power support to electrical loads that do not require battery power support.

In some embodiments, some groups of electrical loads in a computing room receiving electrical power from a power distribution system may be provided enhanced battery power support while other groups of electrical loads in the computing room may be provided standard battery power support. For example, some groups of electrical loads may support applications that are more sensitive than other groups of electrical loads to a loss of power. As an example, more sensitive electrical loads may be provided battery power support that provides support for a longer duration of time than standard battery power support, such as battery power support that may last for 20 minutes without primary or secondary power being supplied to a multi-input UPS compared to standard battery power support which may last for less than 5 minutes. In some embodiments, enhanced battery power support and standard battery power support may have longer or shorter durations. Five minutes and twenty minutes are given as examples and should not be construed as limiting standard battery power support and enhanced battery power support to these example durations.

For example, multi-input UPS 372 includes three batteries 374 and batteries 378 and 380 are electrically coupled to common power bus 376 that supplies electrical power to electrical loads 382 from multi-input UPS 372, whereas multi-input UPS 304 in the same computing room includes two batteries (batteries 350 and 352) and a single battery 354 is coupled to common power bus 320 that supplies electrical power to electrical loads 318. In this example, multi-input UPS 372 may provide enhanced battery power support to electrical loads 382 whereas, multi-input UPS 304 may provide standard battery power support to electrical loads 318. In some embodiments, multi-input UPSs in the same computing room or in the same data center may be customized to provide multiple different levels and/or durations of battery power support to electrical loads in addition to standard and enhanced battery power support based on the requirements of the electrical loads receiving battery power support from the multi-input UPSs.

In some embodiments, a multi-input UPS may feed DC electrical power to a common power bus and a rack power distribution unit (PDU) may be configured to receive DC electrical power. Also, power supplies for computer systems in a rack may be configured to receive DC power from a rack PDU and provide DC power to computer systems mounted in a rack. In some embodiments, a rack PDU or a power supply for a computer system mounted in a rack may include one or more transformers configured to change a voltage of DC power received from a DC common power bus. For example, multi-input UPS 304 may feed DC power to common power bus 320 and common power bus 320 may be a DC common power bus. Electrical loads 318 may include computer systems 360 mounted in racks 362 and may be coupled to DC power bus 320 via rack PDUs 358. In some embodiments, rack PDUs 358 may include one or more transformers and may be configured to receive DC power from DC power bus 320. Also, computer systems 360 may include power supplies configured to receive DC power and may also include one or more transformers configured to lower a voltage of DC power received from rack PDU 358.

In some embodiments, a multi-input UPS may include one or more inverters and may be configured to feed alternating current (AC) electrical power to an AC common power bus. Electrical loads that receive electrical power from the AC common power bus may include computer systems mounted in racks. One or more rack PDUs may electrically couple the one or more computer systems to the AC common power bus. Also, the one or more computer systems may include rectifier circuits that convert AC power received from the AC common power bus into DC power used to operate the computer systems. For example, multi-input UPS 308 includes inverter circuit 356. Multi-input UPS 308 may feed AC power to AC common power bus 328. Electrical loads 326 may include computer systems 366 mounted in racks 364. Rack PDUs 368 may distribute AC electrical power from AC common power bus 328 to computer systems 366. Also, computer systems 366 may include power supplies configured to receive AC power and output DC electrical power to be used to operate computer systems 366.

In some embodiments, a multi-input UPS includes a diode circuit electrically coupled between a primary power circuit and an internal bus of the multi-input UPS in addition to a diode circuit electrically coupled between a secondary power circuit and the internal bus. For example, multi-input UPS 304 includes diode circuit 370 electrically coupled between primary power circuit 330 and internal bus 338 in addition to diode circuit 334 electrically coupled between secondary power circuit 332 and internal bus 338.

In some embodiments, a power distribution system in a data center includes one or more DC common power busses. A DC common power bus may include two rails and a high resistance mid-point ground connection electrically coupled between the two rails. The two rails of the DC common power bus may operate at positive and negative voltages relative to ground. For example, a DC common power bus may include a positive rail that operates at approximately positive 200V DC relative to ground and a negative rail that operates at approximately negative 200V DC relative ground. A high-resistance midpoint ground may be electrically coupled between the positive rail and the negative rail and provide protection to loads connected to the DC common power bus in case of a ground fault.

Figure 4:
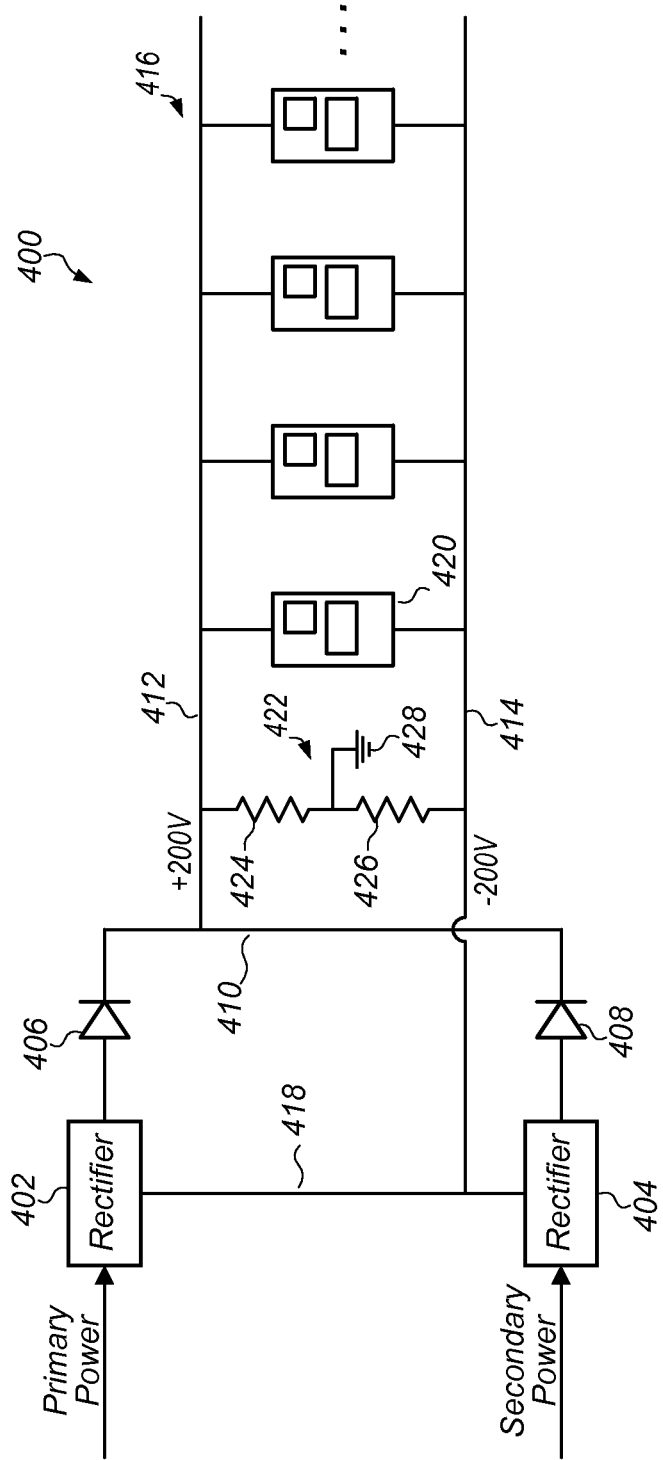
FIG. 4 illustrates a multi-input UPS connected to a dual rail DC power bus, according to some embodiments.

For example, FIG. 4 illustrates a multi-input UPS connected to a dual rail DC common power bus, according to some embodiments. Power distribution system 400 includes primary power circuit 402, secondary power circuit 404, diode circuit 406 and diode circuit 408. Primary power circuit 402 is electrically coupled to bus 410 via diode circuit 406 and secondary power circuit 404 is electrically coupled to bus 410 via diode circuit 408. Positive rail 412 of common power bus 416 is electrically coupled to bus 410 that receives current flow from primary power circuit 402 or primary power circuit 404 and negative rail 414 that returns current flow to primary power circuit 402 or secondary power circuit 404 via bus 418. Electrical loads 420 are electrically coupled between positive rail 412 and negative rail 414 of common power bus 416. Electrical loads 420 may be any of the electrical loads described in FIGS. 1-3, such as rack computer systems. Common power bus 416 also includes a high-resistance midpoint ground tap 422. The high resistance midpoint ground tap 422 includes ground tap 428 electrically coupled to positive rail 412 via high resistance resistor 424 and electrically coupled to negative rail 414 via high resistance resistor 426. In case of a ground fault in one of electrical loads 420 or in positive rail 412 or negative rail 414, high resistance ground tap 422 provides an alternate path to ground thus reducing the effects of the ground fault and protecting electrical loads 420 and common power bus 416 from catastrophic failure during a ground fault.

Modular Multi-Input UPS

In some embodiments, multi-input UPSs may include one or more multi-input UPS modules such as one or more rectifier modules, battery modules, inverter modules, some combination thereof, etc. Rectifier modules may also be referred to herein as "power input modules." Any of the multi-input UPSs described above in regard to FIGS. 1-4 may be a modular multi-input UPS. Each UPS module may be configured to provide one or more sets of multi-input UPS functionality which supports at least a portion of an electrical power support capacity of a modular multi-input UPS or a battery power support capacity of a modular multi-input UPS. For example, a rectifier module may comprise a primary power circuit, a secondary power circuit, and one or more diode circuits and be configured to provide rectification of received AC electrical power into DC electrical power and functionality to transition between a primary power source and a secondary power source. In another example, a battery module may be configured to provide battery functionality which comprises storage and discharge of DC electrical power. In another example, an inverter module may be configured to provide inverter functionality which comprises conversion of received DC electrical power into AC electrical power.

Two or more multi-input UPS modules electrically coupled together may collectively provide at least a certain amount of electrical power support capacity and/or battery power support capacity of a multi-input UPS based at least in part upon the multi-input UPS module functionality provided by the multi-input UPS modules, thereby collectively comprising a modular multi-input UPS. For example, an electrically coupled rectifier module and battery module may collectively provide electrical power support and battery power support to a group of downstream electrical loads, where the rectifier module converts received AC power to DC power and the battery module both stores DC power supplied by the rectifier module and discharges the stored DC power in response to a loss of power from the rectifier module. As referred to herein, a group of downstream electrical loads can include downstream rack computer systems which are configured to perform computing operations.

In some embodiments, a modular multi-input UPS includes one or more rack computer system frames, also referred to herein interchangeably as "rack frames", in which multiple multi-input UPS modules are installed to at least partially comprise one or more modular multi-input UPSs. As used herein, a rack frame can include a structural frame which is configured to structurally support one or more modules and conforms to one or more standardized rack computer system form factors. For example, a rack computer system frame can include a structural frame which is configured to conform to a standardized 19-inch rack form factor, a standardized 23-inch rack form factor, etc. In some embodiments a rack frame may be mounted overhead above a row of rack mounted computer systems and may have a non-standard form factor.

In some embodiments, multi-input UPS modules can be installed interchangeably in various positions within one or more rack frames. As a result, a modular multi-input UPS which includes multi-input UPS modules installed in one or more rack frames can be installed in a computer room in which rack computer systems are installed, such that the space "footprint" of the modular multi-input UPS on the floor of the computer room conforms to one or more footprints configured to accommodate rack computer systems in one or more arrangements in the room.

In some embodiments, a power transmission line electrically coupling multi-input UPS modules in a modular multi-input UPS includes a connecting bus which is coupled to a rack computer system frame in which two or more multi-input UPS modules are installed, such that the multi-input UPS modules are electrically coupled to each other via separately coupling with the connecting bus. The connecting bus can include power connectors which are configured to couple with power connectors of the separate multi-input UPS modules. In some embodiments, the connecting bus and the multi-input UPS modules include power connectors which are blind mate connectors, and the connecting bus can be coupled to the rack frame in a configuration which aligns the power connectors of the connecting bus with the positions of power connectors of multi-input UPS modules in one or more positions in the rack frame when the multi-input UPS modules are mounted in the one or more various rack positions, such that mounting a multi-input UPS module in one or more positions in the rack frame can include aligning and coupling the blind mate power connector of the multi-input UPS module with a corresponding blind mate power connector of the connecting bus, thereby electrically coupling the multi-input UPS module to the connecting bus. As used herein, installing a multi-input UPS module in a rack frame includes mounting the multi-input UPS module in one or more positions in the rack frame, such that the multi-input UPS module is at least partially structurally supported by the rack frame, and electrically coupling the multi-input UPS module to a connecting bus.

In some embodiments, a modular multi-input UPS is configured to provide adjustable electrical power support and adjustable battery power support to a group of electrical loads, such that a power capacity or battery capacity of the modular multi-input UPS can be adjusted, in one or more of power support redundancy and power support capacity, to at least meet the power support requirements of the group of electrical loads coupled downstream. In some embodiments, such adjustment comprises adjusting the configuration of multi-input UPS modules in a modular multi-input UPS based at least in part upon changes in the total power support requirements of the downstream group of electrical loads, including increases in said requirements associated with coupling one or more additional electrical loads to the modular multi-input UPS.

In some embodiments, adjusting the configuration of multi-input UPS modules in a modular multi-input UPS comprises adjusting the quantity of various multi-input UPS modules installed in one or more rack frames of the modular multi-input UPS. For example, where a modular multi-input UPS comprises a rectifier module which can rectify up to 20 KWa of electrical power and a battery module, electrically coupled to the rectifier module, which can store and discharge up to 10 KWa of electrical power in the absence of upstream power received at the rectifier module, the modular UPS can be considered to be configured to provide 10 KWa of power support and 10 Kwa of battery power support. Where the power support requirements of a downstream group of electrical loads electrically coupled to the modular multi-input UPS is at least 15 KWa, an additional 10 KWa battery module can be electrically coupled to the presently-included rectifier module and battery module of the modular multi-input UPS, thereby adding the additional battery module into the modular UPS and adjusting the battery power support capacity of the modular multi-input UPS from 10 KWa to 20 KWa and thereby at least meeting the 15 KWa power support requirement of the downstream group of electrical loads. As used herein, the power support requirement of an electrical load includes an amount of electrical power required to be received by the electrical load to support at least partial operational performance of the electrical load.

As referred to herein, a rectifier module can refer to a module which includes a primary power circuit, a secondary power circuit and one or more diode circuits as described in regard to FIG. 1. A rectifier module included in a modular UPS is configured to be electrically coupled to a primary power feed and a secondary power feed. As referred to herein, an inverter module can refer to a module which is configured to convert electrical power from direct-current power to alternating-current power.

In some embodiments, a battery module is configured to receive, store, and discharge electrical power. The battery module can be configured to discharge electrical power to one or more electrical loads of a group of electrical loads electrically coupled to the battery module in the event of an at least partial loss of received electrical power from a primary power feed or a secondary power feed.

Figure 5:
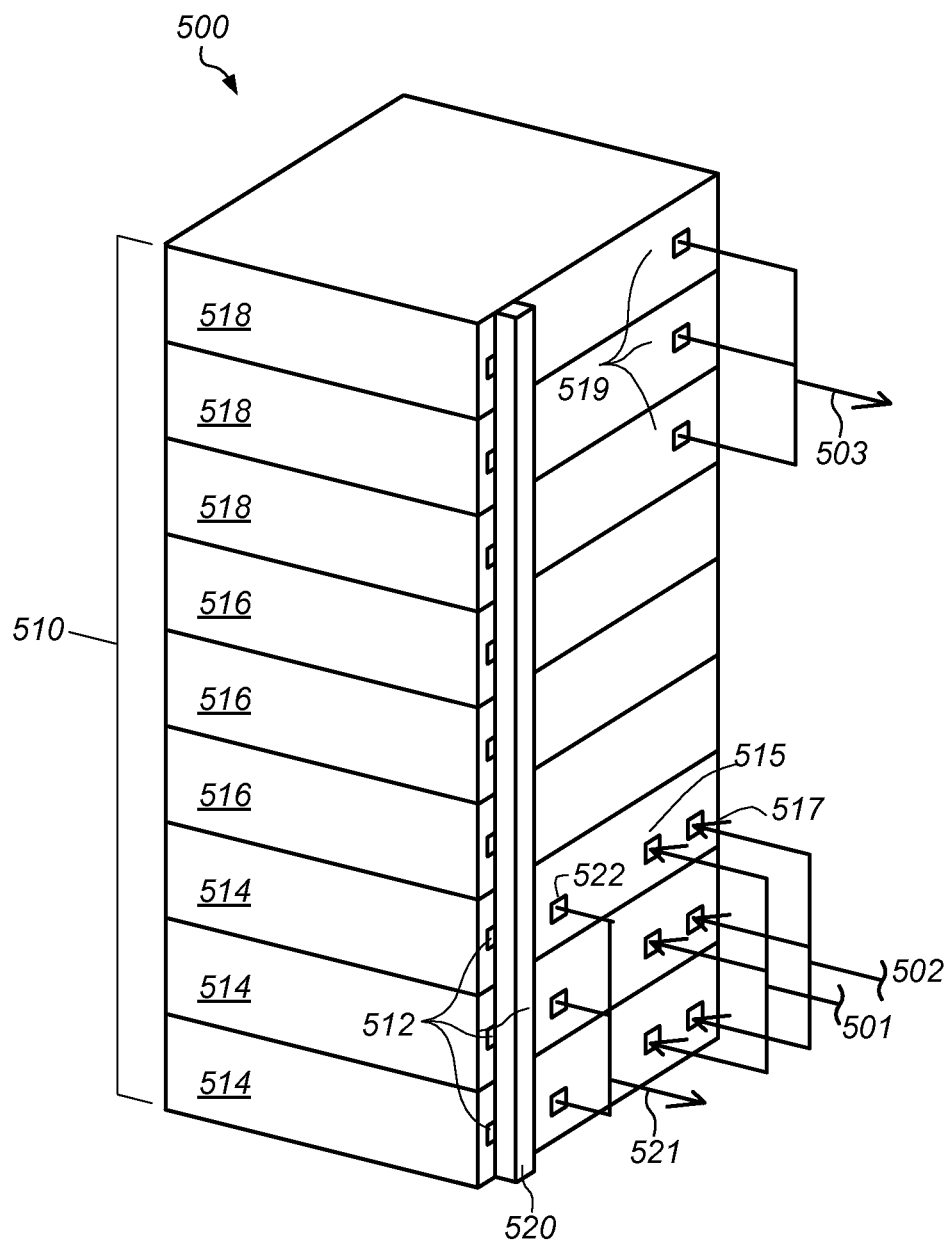
FIG. 5 illustrates a perspective view of a modular multi-input UPS which includes a set of modules electrically coupled together via a connecting bus, according to some embodiments.

FIG. 5 illustrates a perspective view of a modular multi-input UPS which includes a set of multi-input UPS modules electrically coupled together via a connecting bus, according to some embodiments. FIG. 5 shows a modular multi-input UPS 500 which includes a set of multi-input UPS modules 510 arranged in a configuration which conforms to at least one rack computer system form factor, such that the modular multi-input UPS 500 is configured to be installed in a rack position in a data center computer room adjacent to one or more rack computer systems which conform to at least one common rack computer system form factor. In some embodiments, a modular multi-input UPS may be configured to fit in a rack mounted overhead of a rack computer systems in a data center and the overhead rack may have a non-standard form factor.

Multi-input UPS modules 510 include a set of rectifier modules 514, a set of battery modules 516, and a set of inverter modules 518. Each module 510 includes a connector 512 which is configured to couple with a connecting bus bar 520, so that the respective module 510 is electrically coupled to, and is thus configured to supply or receive electrical power from, one or more other multi-input UPS modules 510 which are also coupled to the connecting bus bar 520 via connectors 512 of the one or more other multi-input UPS modules 510.

As shown in the illustrated embodiment, each rectifier module 514 includes a respective primary power inlet connector 515 and a respective secondary power inlet connector 517 which are configured to couple with primary power feed 501 which carries electrical power from a primary power source and are configured to couple with secondary power feed 502 which carries electrical power from a secondary power source. Thus, each rectifier module 514 is configured to receive AC electrical power from a primary power feed via connector 515 or a secondary power feed via connector 517 and supply converted DC electrical power to one or more other UPS modules 510 from a selected one of the primary power feed or the secondary power feed via the respective connector 512 and connecting bus bar 520.

As shown in the illustrated embodiment, each battery storage module 516 coupled to the connecting bus bar 520 is configured to receive DC electrical power from the rectifier modules 514 via the connecting bus bar 520 to which both modules 514 and 516 are coupled.

In some embodiments, a modular multi-input UPS may feed DC electrical power to a DC common power bus. As shown in the illustrated embodiment, each rectifier module 514 is configured to supply DC electrical power to a group of one or more loads via common power bus bar 520 connected to connectors 522. In some embodiments, multiple rectifier modules may be connected to a common power bus in parallel such that the rectifier modules collectively supply DC electrical power to the common power bus. The rectifier modules may also feed DC electrical power to a common power bus from one or more battery modules. DC electrical power may flow from one or more battery modules electrically coupled to one or more rectifier modules via a connecting bus. For example, rectifier modules 514 may feed DC electrical power from battery modules 516, wherein the DC electrical power flows from battery modules 516 to rectifier modules 514 via connecting bus bar 520 and then flows through an internal bus of rectifier modules 514 to common power bus 521.

In some embodiments, a modular multi-input UPS may feed AC electrical power to an AC common power bus bar. As shown in the illustrated embodiment, each inverter module 518 coupled to the connecting bus bar 520 is configured to receive DC electrical power from the connecting bus bar 520 via a connector 512, convert the received DC power into AC power, and supply the converted AC power to a group of one or more electrical loads via output connector 519 and an AC common power bus 503 which electrically couples the connector 519 to the group of one or more electrical loads. As the inverter modules 518 are configured to receive electrical power from the connecting bus bar 520, and both the rectifier modules 514 and the battery modules 516 are coupled to the connecting bus bar 520, the inverter modules 518 can receive electrical power provided to the connecting bus bar 520 from one or more of the rectifier modules and battery modules, thereby providing an uninterruptible supply of AC power, to a coupled downstream group of electrical loads, from one or more of the rectifier modules and battery modules.

In some embodiments, a modular multi-input UPS includes multiple inverter modules which are configured to supply synchronized AC power feeds in parallel, such that the synchronized parallel AC power feeds can be distributed via an AC common power bus. To supply synchronized AC power feeds, the multiple inverter modules can include one or more components which are configured to synchronize the power feeds supplied by each of the inverter modules. In the illustrated embodiment, for example, the inverter modules 518 can supply, via connectors 519, separate parallel and synchronized AC power feeds which are combined into a single AC power feed which is carried by AC common power bus 503.

In some embodiments, a modular multi-input UPS may include redundant rectifier modules, battery modules, or inverter modules. For example, a modular multi-input UPS may be configured with N+1 redundancy. Meaning that the modular multi-input UPS may include an additional rectifier module, battery module and/or inverter module over a number (N) of rectifier modules, battery modules, and/or inverter modules that are required to meet electrical power capacity requirements of downstream loads or battery power support requirements of downstream loads that receive electrical power and battery power support from the multi-input UPS. If any one of the rectifier modules, battery modules, or inverter modules fails, the additional rectifier module, battery module, or inverter module may make up for the lost capacity of the failed module such that the modular multi-input UPS continues to meet the electrical power capacity and/or battery power support requirements of the downstream loads despite the failed module. In some embodiments, a modular multi-input UPS may include hot-swappable modules, such that a module may be added to or taken away from the modular multi-input UPS while the modular multi-input UPS is providing electrical power and battery power support to downstream loads.

Figure 6:
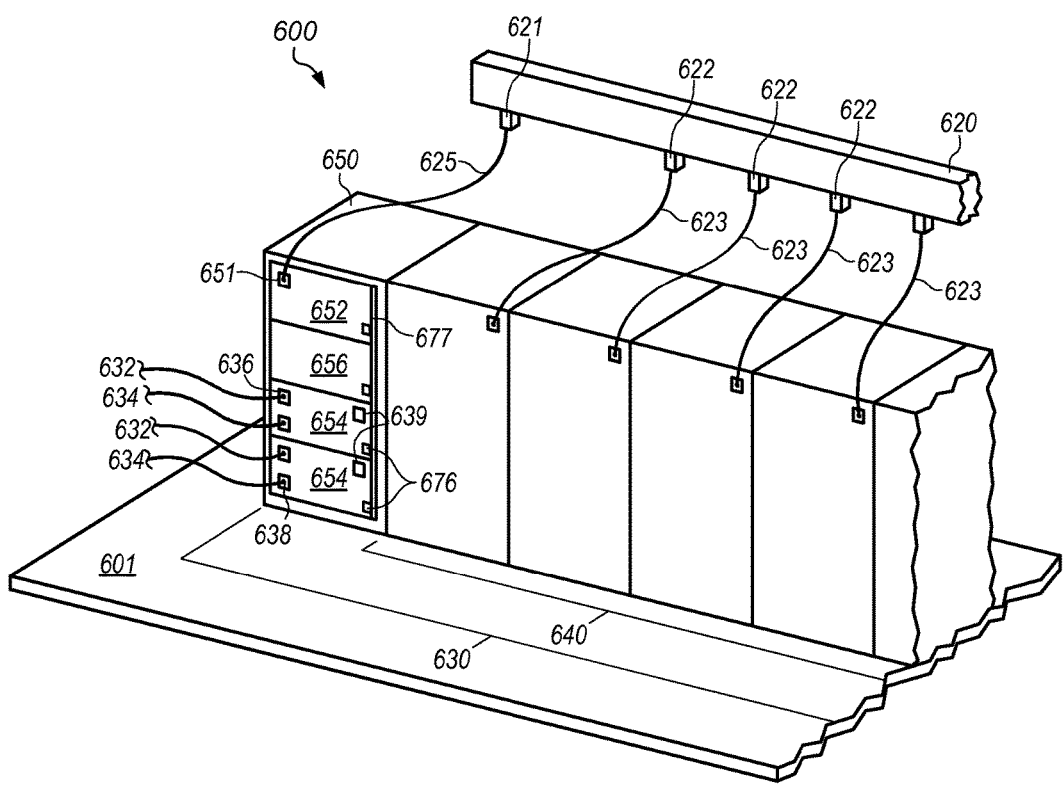
FIG. 6 illustrates a perspective view of a computer room which includes a modular multi-input UPS which supplies power via a common power bus, according to some embodiments.

FIG. 6 illustrates a perspective view of a computer room which includes a modular multi-input UPS, according to some embodiments. The modular multi-input UPS illustrated in FIG. 6 can include any of the embodiments of modular multi-input UPSs encompassed herein.

Computer room 600 includes a row of occupied rack frames 630 installed on a floor space 601 of the computer room. The row of occupied rack frames includes a set of rack computer systems 640 and a modular multi-input UPS 650 which includes a rack frame in which separate electrically-coupled multi-input UPS modules 652, 654, and 656 are installed. As shown, the rack computer systems 640 and modular multi-input UPS 650 are both configured to conform to a common rack computer system form factor, so that the modular multi-input UPS 650 and rack computer systems 640 can be installed in adjacent positions in the computer room 600.

In some embodiments, a modular multi-input UPS includes a set of UPS modules which are installed in separate rack positions in a common rack frame and are electrically coupled together via one or more instances of power transmission lines which extend between the separate multi-input UPS modules internally with respect to the common rack frame. The one or more instances of power transmission lines can include one or more connecting bus bars which are coupled to the common rack frame and configured to couple with one or more multi-input UPS modules based at least in part upon the one or more multi-input UPS modules being mounted in the common rack frame. The relative quantity and configurations of separate multi-input UPS modules 652, 654, and 656 installed in the common rack frame can be adjusted based on the electrical power support requirements and battery support requirements of the rack computer systems 640. In the illustrated embodiment, for example, modular multi-input UPS 650 includes two rectifier modules 654 which are installed in lower rack positions in the common rack frame of the UPS, an individual inverter module 652 installed in an upper rack position in the common rack frame, and an individual battery module 656 installed in a center rack position in the common rack frame. Each individual module 652, 654, 656 can include a separate chassis.

As shown, rectifier modules 654 includes a primary power feed connector 636 which is configured to electrically couple with a primary power feed 632 and a secondary power feed connector 638 which is configured to electrically couple with a secondary power feed 634. In some embodiments, a primary power feed and a secondary power feed may be supplied to a rectifier module via a transmission line, bus, or other suitable means of transmitting electrical power.

As further shown, the inverter module 652 includes a power distribution connector 651 which is configured to electrically couple with the rack computer systems 640 via one or more instances of power transmission lines. In the illustrated embodiment, the connector 651 is coupled, via line 625 and busway connector 621, to the busway 620 to which each of the loads 640 are coupled, thereby electrically coupling the inverter module 652 to the loads 640 via the busway 620. The inverter module 652 can supply AC electrical power to the busway 620, and the power carried on the busway 620 can be supplied to the loads 640 via the busway connectors 622 and lines 623.

In some embodiments, each multi-input UPS module 652, 654, 656 includes one or more DC electrical connectors 676 which are configured to couple with one or more instances of power transmission lines 677 to electrically couple the modules together. For example, the rectifier module 654 can include a DC connector 676 which can be electrically coupled with one or more DC connectors 676 of one or more of the battery modules 656 to configure the battery modules 656 to receive and store DC power supplied by the rectifier module 654. In addition, the battery modules 656 can be coupled, via one or more DC connectors 676 and instances of power transmission lines 677, to the inverter module 652, so that the inverter module is configured to receive DC electrical power supplied by at least the battery modules 656, convert the power to AC power, and supply the converted AC power via at least connector 651. In some embodiments, the instances of power transmission lines 677 include one or more power cables, and the modules 652, 654, and 656 are coupled in series between separate types of UPS modules, so that the battery module 656 continuously supply, to the inverter module 652, electrical power which originates from power received from the rectifier module or power discharged from the battery modules. In some embodiments, the one or more instances of power transmission lines 677 which electrically couple the modules 652, 654, 656 includes one or more connecting bus bars coupled to the common rack frame in which the modules are installed, where each separate module 652, 654, 656 is coupled to the connecting bus bar via separate DC connectors, so that the rectifier supplies DC power to the connecting bus bar, the battery modules receive and store DC power from the connecting bus bar when the rectifier module is supplying power, the battery modules discharge DC power to the connecting bus bar when the rectifier module at least partially fails to supply power to the connecting bus bar, and the inverter module receives DC power, supplied by one or more of the rectifier modules, battery modules, etc., via the connecting bus bar.

In some embodiments, a modular multi-input UPS may not include an inverter module and one or more rectifier modules may supply DC electrical power to a common power bus. For example, rectifier modules 654 include connectors 639. In embodiments in which modular multi-input UPS 650 feeds DC power to busway 620, modular multi-input UPS 650 may not include inverter 652 and line 625 may electrically couple one or more of rectifier modules 654 to busway 620 via a line 625 coupled to one or more of connectors 639.

The rack computer systems 640 are each coupled to a power busway 620 via separate instances of power transmission lines 623 which couple to separate busway connectors 622, thereby electrically coupling each of the rack computer systems 640 in parallel with the busway 620. The modular multi-input UPSs are each coupled in parallel to the same power busway 620 via separate distribution connectors 651 or 639 which are separately coupled, via separate instances of power transmission lines 625 and busway connectors 621. The inverter module 652 of the modular multi-input UPS 650 includes a power distribution connector 651 which is configured to supply AC power and is coupled to the busway 620 via one or more instances of power transmission lines 625 and busway connector 621. The rectifier modules of the modular multi-input UPS 650 include power distribution connectors 639 which are configured to supply DC power and are configured to couple to busway 620 via one or more instances of power transmission lines 625 and busway connectors 621. (For sake of clarity rectifier modules 654 are not depicted connected to busway 620 in FIG. 6. However, in embodiments where busway 620 feeds DC power, modular multi-input UPS 650 may not include inverter module 652 and power transmission lines 625 may be coupled to rectifier modules 654 via connectors 639 instead of being connected to inverter module 652 via connector 651.) As a result, the modular multi-input UPS 650 can supply electrical power to the busway 620, and the power carried on the busway 620 can be collectively supplied to the rack computer systems 640 in parallel.

In some embodiments, a modular multi-input UPS, such as modular multi-input UPS 650 may be connected to a busway via a bus connection without using tap boxes as shown in FIG. 6. For example, busway 620 may directly connect to a busway connection included in modular multi-input UPS 650 (not shown in FIG. 6). For example, modular multi-input UPS 650 may be directly connected to busway 620 as shown in FIG. 7.

In some embodiments, the modular multi-input UPS 650 provides scalable and redundant electrical power support and/or battery power support to the rack computer systems 640, based at least in part upon the adjustable configuration of multi-input UPS modules 652, 654, 656 in the rack frame of the multi-input UPS 650. In some embodiments, the modular multi-input UPS 650 includes various sets of multi-input UPS modules which can be adjusted to adjustably configure the electrical power support capacity or battery support capacity of the multi-input UPS 650 based on the electrical power support requirements or battery power support requirements of the loads 640.

Figure 7:
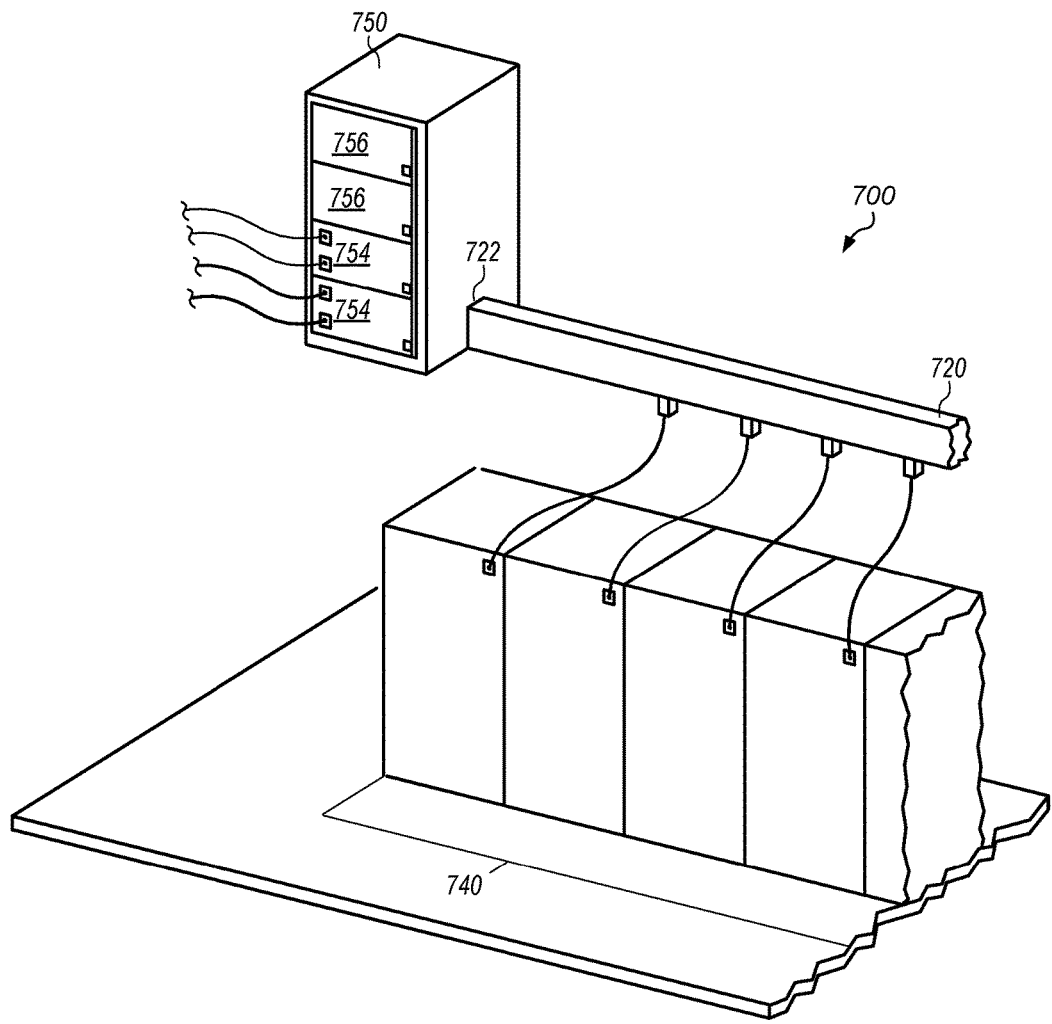
FIG. 7 illustrates a perspective view of a computer room which includes an overhead mounted modular multi-input UPS which supplies power via a common power bus, according to some embodiments.

FIG. 7 illustrates a perspective view of a computer room which includes an overhead mounted modular multi-input UPS which supplies power via a common power bus, according to some embodiments. Computer room 700 includes a set of rack computer systems 740 that receive electrical power from an overhead mounted multi-input UPS 750 via common power bus 720. Multi-input UPS 750 includes rectifier modules 754 and battery modules 756, however multi-input UPS 750 does not include an inverter module. Multi-input UPS 750 supplies DC electrical power to common power bus 720. Multi-input UPS 750 and rectifier modules 754 and battery modules 756 may function in the same manner as multi-input UPS 650, rectifier module 654 and battery modules 656 described in regard to FIG. 6. Common power bus 720 may distribute DC power to the set of rack computer systems 740 in a similar manner as busway 620 described in FIG. 6. In some embodiments, an overhead mounted multi-input UPS may be directly connected to a common power bus 720 without using transmission lines such as transmission lines 625 shown in FIG. 6. For example, common power bus 720 is connected to modular multi-input UPS 750 direct busway connection 722.

In some embodiments, sets of computer racks, such as sets of computer racks 740 may be mounted below an overhead mounted multi-input UPS, such as multi-input UPS 750 thus allowing additional computer racks to be mounted in a given amount of floor space in a computer room.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center comprising:
   a power distribution system configured to provide electrical power support to groups of electrical loads in the data center, wherein the power distribution system comprises:
   a primary power feed from a primary power source;
   a secondary power feed from a secondary power source; and
   multi-input uninterruptible power systems (UPSs), wherein each multi-input UPS of the multi-input UPSs is configured to provide electrical power support to a respective group of electrical loads of the groups of electrical loads;
   wherein each of the multi-input UPSs comprises:
   a primary rectifier circuit electrically coupled to the primary power feed and configured to convert electrical power received from the primary power source to direct current (DC) power, wherein the primary rectifier circuit is electrically coupled to an internal power bus of the multi-input UPS, wherein the internal power bus is electrically coupled to a respective group of electrical loads of the groups of electrical loads;

a secondary rectifier circuit electrically coupled to the secondary power feed and configured to convert electrical power received from the secondary power source to DC power; and a diode circuit, wherein the secondary rectifier circuit is electrically coupled to the internal power bus via the diode circuit, wherein the diode circuit is configured to prevent flow of electrical power into the secondary rectifier circuit from the internal power bus and is configured to permit flow of electrical power to the respective group of electrical loads from the secondary rectifier circuit, via the internal power bus when the multi-input UPS is not receiving electrical power from the primary power source.

2. The data center of claim 1, wherein the power distribution system further comprises:

respective DC common power busses each electrically coupled to a respective internal power bus of a respective multi-input UPS of the multi-input UPSs, wherein the respective DC common power busses are each configured to distribute DC power to a respective group of loads provided electrical power support from the respective multi-input UPS.

3. The data center of claim 1, wherein the power distribution system further comprises:

respective alternating current (AC) common power busses each electrically coupled to a separate respective one of the multi-input UPSs that feed AC power, wherein the respective AC common power busses are each configured to distribute AC power to a respective group of loads provided electrical power support from one of the respective multi-input UPSs that feed AC power, wherein each of the respective multi-input UPSs that feed AC power further comprise:

an inverter circuit electrically coupled between a respective internal power bus of each respective multi-input UPS of the multi-input UPSs that feed AC power and a respective AC common power bus of the respective AC common power busses.

4. The data center of claim 1, wherein the power distribution system further comprises:

respective common power busses each electrically coupled to a separate respective internal power bus of a separate respective multi-input UPS of the multi-input UPSs; and groups of one or more batteries, wherein for each of the respective common power busses a respective group of the groups of one or more batteries is electrically coupled to:

the common power bus, or the internal power bus of the respective multi-input UPSs electrically coupled to the common power bus;

wherein the power distribution systems is configured to provide, via the respective common power busses, battery power support to respective groups of loads supplied electrical power from the respective multi-input UPSs.

5. The data center of claim 4, wherein the power distribution system further comprises:

one or more additional respective common power busses each electrically coupled to separate respective internal power busses of one or more additional respective multi-input UPS of the multi-input UPSs;

wherein the power distribution systems is configured to provide, via the one or more additional common power busses, non-battery supported electrical power support to one or more different respective groups of loads of the groups of loads that are supplied electrical power from the one or more additional respective multi-input UPSs.

6. The data center of claim 4, wherein the power distribution system further comprises:

an additional common power bus electrically coupled to a separate internal power bus of a separate multi-input UPS of the multi-input UPSs;

wherein the power distribution system is configured to provide, via the additional common power bus, a different level of battery power support to an additional group of loads of the groups of loads, wherein the different level of battery power support provides battery power support for a longer amount of time during a loss of power event than the battery power support provided to the respective groups of electrical loads via the respective common power busses.

7. A multi-input uninterruptible power system (UPS) comprising:

a primary power circuit configured to convert alternating current (AC) power received via a primary input of the multi-input UPS to direct current (DC) power, wherein the primary power circuit is electrically coupled to a power bus of the multi-input UPS that is electrically coupled to an output of the multi-input UPS;

a secondary power circuit configured to convert AC power received via a secondary input of the apparatus to DC power; and a diode circuit, wherein the secondary power circuit is electrically coupled to the power bus via the diode circuit, wherein the diode circuit is configured to prevent flow of electrical power into the secondary power circuit and configured to permit flow of electrical power to the power bus from the secondary power circuit when power is not received via the primary input, wherein the multi-input UPS is configured to provide electrical power support to a group of electrical loads.

8. The multi-input UPS of claim 7, wherein the multi-input UPS further comprises a battery electrically coupled to the power bus.

9. The multi-input UPS of claim 8, wherein the battery comprises one or more battery modules such that a duration of battery power support provided by the multi-input UPS is adjustable, wherein to adjust the duration of the battery power support, the multi-input UPS is configured to accept additional battery modules.

10. The multi-input UPS of claim 7, wherein the multi-input UPS further comprises:

an inverter electrically coupled between the power bus and the output of the multi-input UPS, wherein, the multi-input UPS is configured to feed alternating current (AC) power to a group of loads via the output of the multi-input UPS.

11. The multi-input UPS of claim 7, wherein the multi-input UPS is configured to feed DC power to a group of loads via the output of the multi-input UPS.

12. The multi-input UPS of claim 7, wherein the multi-input UPS is configured such that a power capacity of the multi-input UPS is adjustable,
wherein the primary power circuit, the secondary power circuit and the diode circuit are included in a power input module,
wherein to adjust the power capacity, the multi-input UPS is configured to accept an additional power input module.

13. The multi-input UPS of claim 12, further comprising:
a standard rack configured to structurally support the power input module, the additional power input module, a battery module, or an inverter module.

14. The multi-input UPS of claim 7, further comprising:
a power input module, wherein the power input module comprises the primary power circuit, the secondary power circuit, and the diode circuit; and
an overhead frame configured to mount in a space above a rack computer system in a data center, wherein the overhead frame is configured to structurally support the power input module.

15. A power distribution system,
wherein the power distribution system is configured to provide uninterruptible power support to a particular group of loads of groups of loads in a facility, and wherein the power distribution system comprises:
a primary power circuit configured to convert alternating current (AC) power received from a primary power source to direct current (DC) power, wherein the primary power circuit is electrically coupled a common power bus configured to distribute electrical power to the particular group of loads;
a secondary power circuit configured to convert AC power received from a secondary power source to DC power;
a power source selection circuit, wherein the secondary power circuit is electrically coupled to the common power bus via the power source selection circuit, wherein the power source selection circuit is configured to prevent flow of electrical power into the secondary power circuit and configured to permit flow of electrical power to the particular group of loads via the common power bus from the secondary power circuit when power is not received from the primary power source; and
a battery electrically coupled to the common power bus downstream of the primary power circuit and the secondary power circuit.

16. The power distribution system of claim 15, wherein the battery comprises one or more battery modules,
wherein the power distribution system is configured to accept an additional battery module to adjust a battery power support capacity of the power distribution system provided to the particular group of electrical loads.

17. The power distribution system of claim 15, wherein:
the primary power circuit, the secondary power circuit and the power source selection circuit are included in a power input module, and
to increase a power capacity of the power distribution system, the power distribution system is configured to accept an additional power input module.

18. The power distribution system of claim 17, further comprising an inverter module,
wherein, the power distribution system is configured to provide uninterruptible AC power support to the particular group of loads and is configured to accept an additional inverter module to increase a power capacity of the power distribution system.

19. The power distribution system of claim 15, wherein the power distribution system is configured to supply DC power to the particular group of loads via the common power bus at a voltage equal to or greater than about 200 volts.

20. The power distribution system of claim 15, wherein the power source selection circuit comprises a diode circuit, wherein the power distribution system further comprises:
an additional power source selection circuit wherein the primary power circuit is electrically coupled to the common power bus via the additional power source selection circuit, wherein the additional power source selection circuit comprises a diode circuit.

21. The power distribution system of claim 15, wherein the common power bus comprises:
a positive voltage rail;
a negative voltage rail; and
a high-resistance mid-point ground connection electrically coupled between the positive voltage rail and the negative voltage rail, wherein the high resistance mid-point ground connection provides fault protection for respective loads of the particular group of loads.

* * * * *